(12) United States Patent
Niederberger (10) Patent No.: US 9,238,492 B2
(45) Date of Patent: Jan. 19, 2016

(54) CHASSIS FOR A ROBOT

(71) Applicant: Anton Niederberger, Oberdorf (CH)

(72) Inventor: Anton Niederberger, Oberdorf (CH)

(73) Assignee: Logistics Wash Holding AG, Lucerne (CH)

( * ) Notice: Subject to any disclaimer, the term of this patent is extended or adjusted under 35 U.S.C. 154(b) by 0 days.

(21) Appl. No.: 14/353,033

(22) PCT Filed: Nov. 6, 2012

(86) PCT No.: PCT/EP2012/071907
§ 371 (c)(1),
(2) Date: Apr. 21, 2014

(87) PCT Pub. No.: WO2013/068336
PCT Pub. Date: May 16, 2013

(65) Prior Publication Data
US 2014/0311811 A1    Oct. 23, 2014

(30) Foreign Application Priority Data

Nov. 7, 2011   (CH) ...................................... 1789/11

(51) Int. Cl.
*B62D 55/265*   (2006.01)
*B62D 57/024*   (2006.01)
(52) U.S. Cl.
CPC ............ *B62D 55/265* (2013.01); *B62D 57/024* (2013.01); *Y10S 901/01* (2013.01)

(58) Field of Classification Search
CPC ... B62D 57/024; B62D 55/265; Y10S 901/01
See application file for complete search history.

(56) References Cited

U.S. PATENT DOCUMENTS

| | | | | |
|---|---|---|---|---|
| 4,842,086 A * | 6/1989 | Michna ......................... | 180/9.1 |
| 5,366,038 A * | 11/1994 | Hidetsugu et al. ............ | 180/164 |
| 5,894,901 A * | 4/1999 | Awamura et al. ............ | 180/9.54 |
| 7,288,912 B2 * | 10/2007 | Landry et al. ................. | 318/580 |
| 2006/0190146 A1 * | 8/2006 | Morse et al. .................... | 701/23 |
| 2008/0077276 A1 * | 3/2008 | Montero Sanjuan et al. . | 700/245 |
| 2012/0116583 A1 * | 5/2012 | Beard et al. .................... | 700/245 |
| 2012/0187752 A1 * | 7/2012 | Niederberger ................ | 305/165 |
| 2013/0206492 A1 * | 8/2013 | Urakami ........................ | 180/164 |
| 2014/0014430 A1 * | 1/2014 | Urakami ........................ | 180/164 |
| 2014/0020196 A1 * | 1/2014 | Hayashi ......................... | 15/97.1 |

FOREIGN PATENT DOCUMENTS

DE         10320570 B4    4/2005

* cited by examiner

*Primary Examiner* — Kevin Hurley
*Assistant Examiner* — Gabriela C Craciun
(74) *Attorney, Agent, or Firm* — Michael Soderman (57) ABSTRACT

In a chassis (1) for a robot for traveling over smooth, curved or firm surfaces with two track guides that are mirror-symmetric to one another and firmly arranged in the chassis (1) in parallel with the traveling surface and self-contained in each case, along which controllable adhesive modules (14) circulate one behind the other in such a way that their adhesive feet (15), which can be lifted and lowered vis-a-vis the traveling surface, always point towards the traveling surface, the individual adhesive modules (14) have their own controllable lifting and traveling drives in each case.

9 Claims, 14 Drawing Sheets

CHASSIS FOR A ROBOT

CROSS REFERENCE TO RELATED APPLICATIONS

This application is the U.S. national stage of International Application No. PCT/EP2012/071907 filed on Nov. 6, 2012, and claims the benefit thereof. The international application claims the benefit of Swiss Application No. CH 1789/11 filed on Nov. 7, 2011; all applications are incorporated by reference herein in their entirety.

BACKGROUND

A self-climbing chassis for facades, especially glass facades, that has a drive mechanism made up of endless series of controllable suction units is known from the category-defining DE 103 20 570 B4. The suction units circulate at the traveling level of the chassis on two track guides that are self-contained in each case and mechanically connected to one another; the suction sides of the suction units always point towards the traveling level. The suction units are connected to one another at a fixed distance for this with driving means, such as a chain or a toothed belt that are driven by a motor. The traction means provide for a synchronous circulation of all of the suction units for each track guide. A pneumatic suction unit control is designed for uniform lifting of the suction units. The chassis is advantageously flat as a result of the circulation of the suction units at the traveling level, which is why its center of gravity is located close to the traveling surface, which helps to keep it from tipping over on a vertical wall, for instance. Furthermore, it very easy to steer and makes it possible to overcome small obstacles such as glass profile rods or mounting straps.

A drawback of the chassis is that travel can only be done over heavily curved surfaces under certain circumstances, because suction units can either hang in the air as a result of the uniformly set suction-unit lifting and fixed suction-unit spacing or can skid the chassis. A sensor system monitors conditions that could present the risk of a crash and brings the chassis to a standstill if necessary. The chassis speed is quite slow as a result of the time-consuming negotiation of the direction-changing points, and its own weight is relatively high as a result of its universal pneumatic control.

SUMMARY

In a chassis (1) for a robot for traveling over smooth, curved or firm surfaces with two track guides that are mirror-symmetric to one another and firmly arranged in the chassis (1) in parallel with the traveling surface and self-contained in each case, along which controllable adhesive modules (14) circulate one behind the other in such a way that their adhesive feet (15), which can be lifted and lowered vis-a-vis the traveling surface, always point towards the traveling surface, the individual adhesive modules (14) have their own controllable lifting and traveling drives in each case.

DETAILED DESCRIPTION

The invention is based on the problem of creating a chassis for a robot that is flat and lightweight, that has little susceptibility to malfunctions, that has good steering capabilities, that can overcome small obstacles, as well as negative and positive bumps, and that can develop an acceptable traveling speed.

The problem is solved as per the invention. Advantageous design forms and further design developments of the invention are specified in the dependent claims.

Diverse benefits result for the chassis and a robot in operation that is realized with the chassis because all of the adhesive modules can be individually and also continuously variably and automatically driven both with regard to their movement along their track guides and with regard to their lifting. The chassis is especially flat and lightweight, it has little susceptibility to malfunctions, it has excellent steering capabilities, it is relatively quick and is in a position to climb over small obstacles and fairly large bumps or offsets. The invention together with all of its advantages is to be explained in more detail below with the aid of an example.

BRIEF DESCRIPTION OF THE DRAWINGS

The following are shown with regard to this in the accompanying drawings.

DETAILED DESCRIPTION OF THE PREFERRED EMBODIMENT

Figure 1:
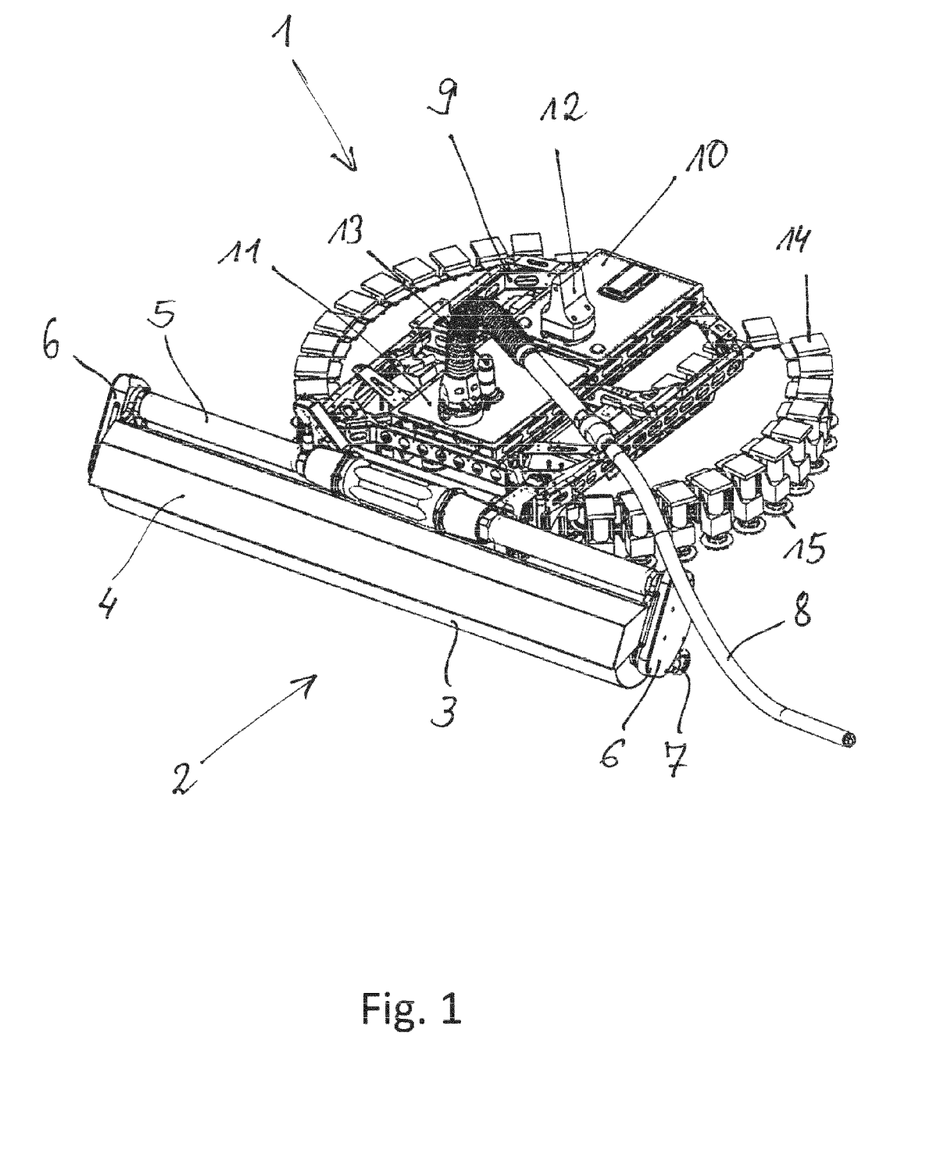
FIG. 1 shows a robot specifically used for cleaning smooth, firm surfaces in a perspective view from above.

A robot shown in FIG. 1 is suitable for cleaning glass facades, for instance, or other firm, smooth, curved surfaces of buildings. To this end, its chassis 1 holds a cleaning device 2 as an add-on in the front, which has a cleaning brush 3, a splash guard 4 and an adjustment shaft 5 to adjust the height of the cleaning brush 3, held by a holder 6 on both sides and support wheels 7. The cleaning fluid is supplied to the cleaning device 2 via a highly flexible multifunctional tube 8 and the chassis 1. Connecting a different or further add-on device to the front of the chassis 1 instead of a cleaning device 2, for instance an inspection camera or a remote-controlled manipulator for maintenance and repair work, is within the sphere of protection of the invention.

The chassis 1 has a support frame 9 made of a stiff, perforated band. Two assemblies 10, 11 are attached in the support frame 9. The first assembly 10 contains an operation device that can be remote controlled in a wireless fashion via an antenna 12. The second assembly 11, to which the multifunctional tube 8 is coupled, contains further operation devices. The chassis 1 is supplied with electricity, pneumatics and additionally, in the case of a cleaning robot, with cleaning fluid from a suitable location via the multifunctional tube 8. Adhesive modules 14, whose arrangement, structure and function will be described in more detail below, are supplied with the required resources from a distributor connection 13 of the second assembly 11. It should first be mentioned that two fixed and in each case self-contained track guides are mounted in the chassis 1 in parallel with a traveling surface of the robot; the adhesive modules 14, lined up one behind the other, circulate along the track guides in such a way that their adhesive feet 15, which can be lifted and lowered with respect to the traveling surface, always point towards the traveling surface. The track guides, which still have to be described in more detail, are comprised of two parallel straight guides with circular-arc guides connected to the outside that lie in a conceptual full circle that includes the interior straight guides. To move the robot forwards or backwards, the adhesive feet 15 that run concordantly on the straight guides are merely lowered in an automatically controlled fashion and actuated with a vacuum, whereas the adhesive feet 15 running on the circular-arc guides are vented and raised. To rotate the robot in a clockwise direction or a counter clockwise direction, in contrast, the adhesive feet 15 that run concordantly on the circular-arc guides are merely lowered in an automatically controlled fashion and actuated with a vacuum, whereas the adhesive feet 15 running on the straight guides are vented and raised.

Figure 2:
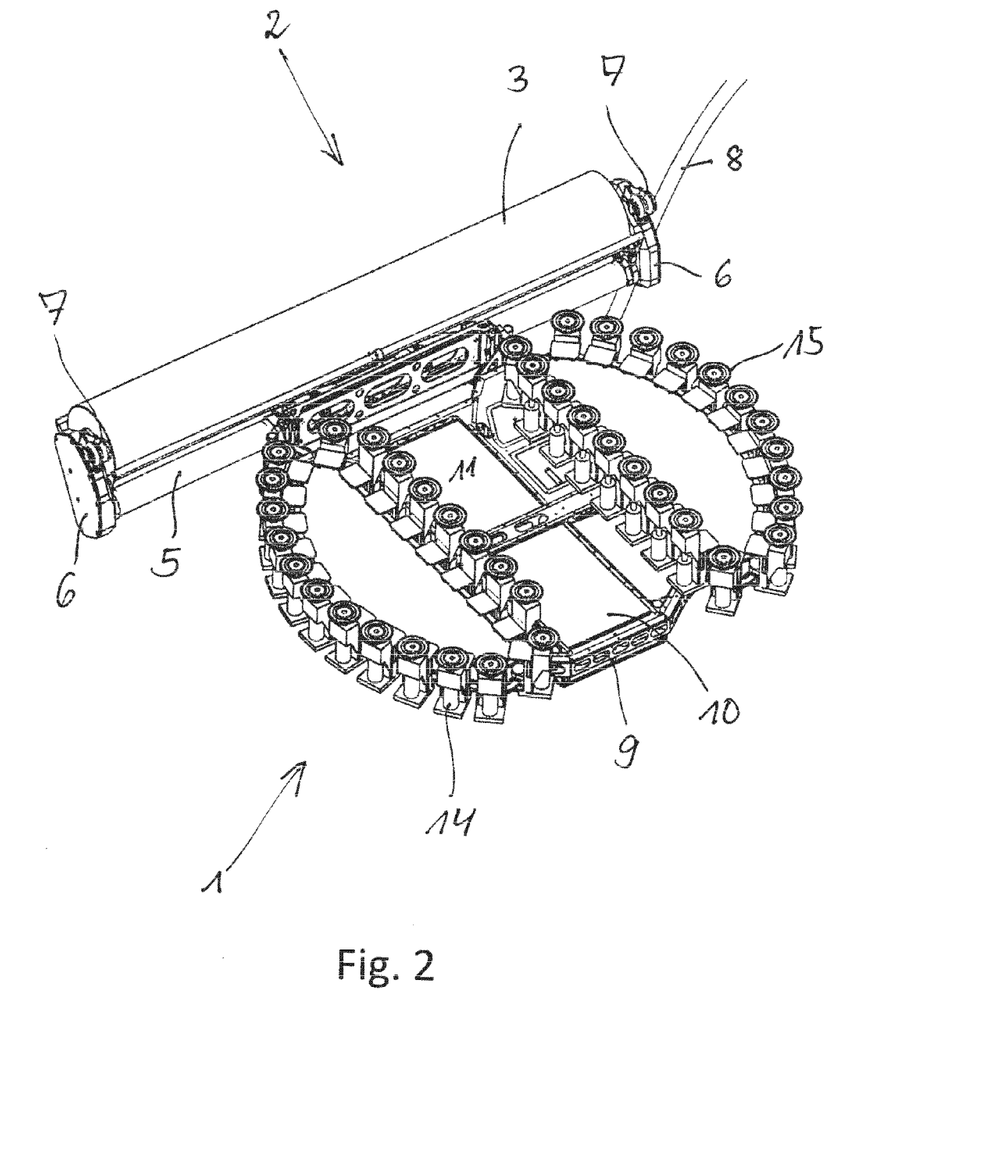
FIG. 2 shows the robot in a perspective view from below.

FIG. 2 shows the cleaning robot from the bottom. The same components, as is also done throughout the other figures, are always provided with the same reference numbers. The adhesive modules 14 have pneumatically actuated suction units on the bottom as adhesive feet 15. Alternatively, small electromagnets could be provided for the adhesive feet 15 if the robot travels on surfaces that can be magnetized.

Figure 3:
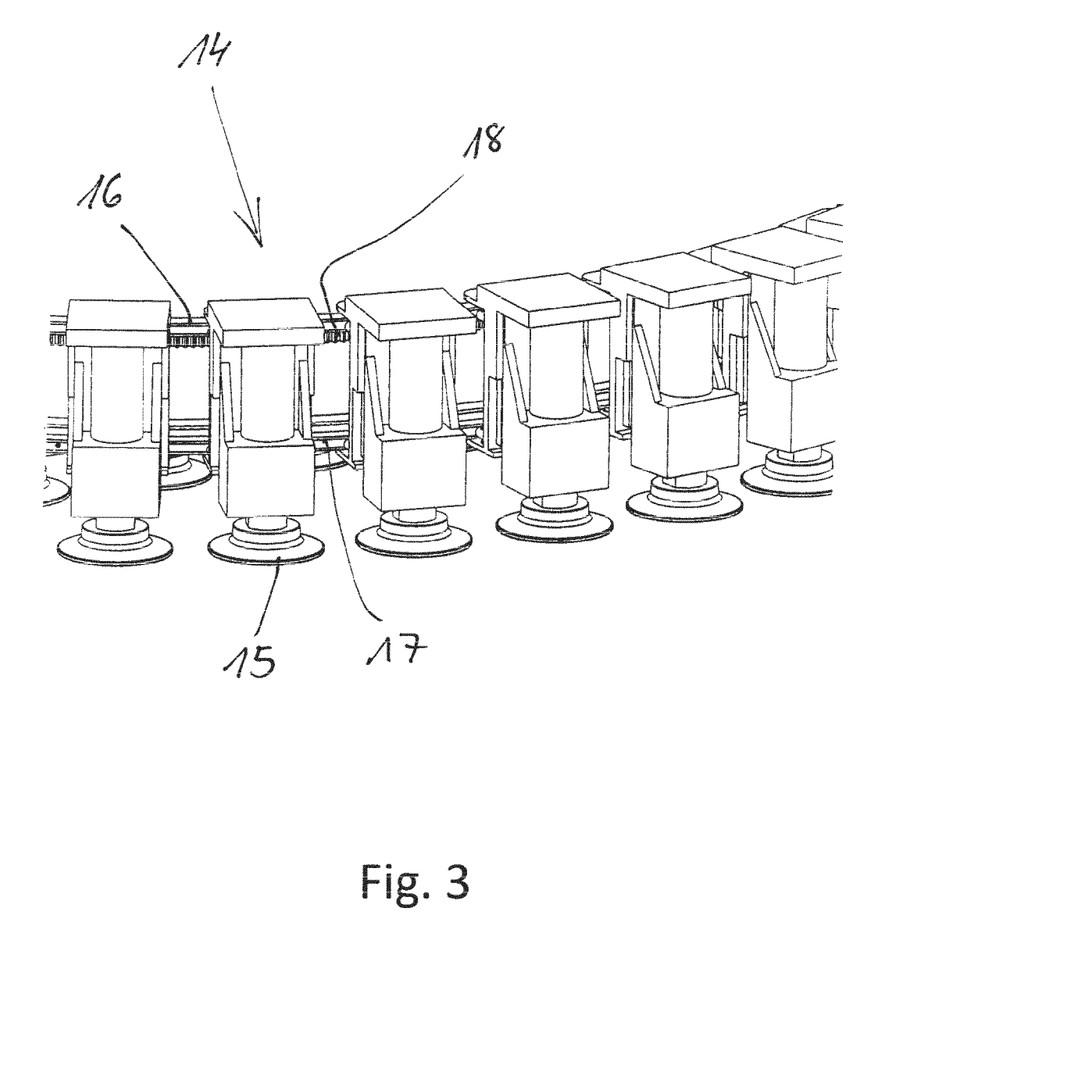
FIG. 3 shows the basic structure of a track guide for adhesive modules.

FIG. 3 shows the basic structure of the track guides for the adhesive modules 14. Each of the track guides is comprised of a pair of U profile rails 16, 17 that form, vertically spaced, a guide for guide rollers that support the adhesive modules 14. The U profile rails 16, 17 are extended on the straight-guide sections and appropriately curved on the sections of the circular-arc curves, but are self-contained on the whole in each case. Rack rails 18 that the gears of the adhesive modules 14, which are still to be presented, engage with for the purpose of driving ahead the adhesive modules 14 are installed to accompany the upper profile rails 16.

Figure 4:
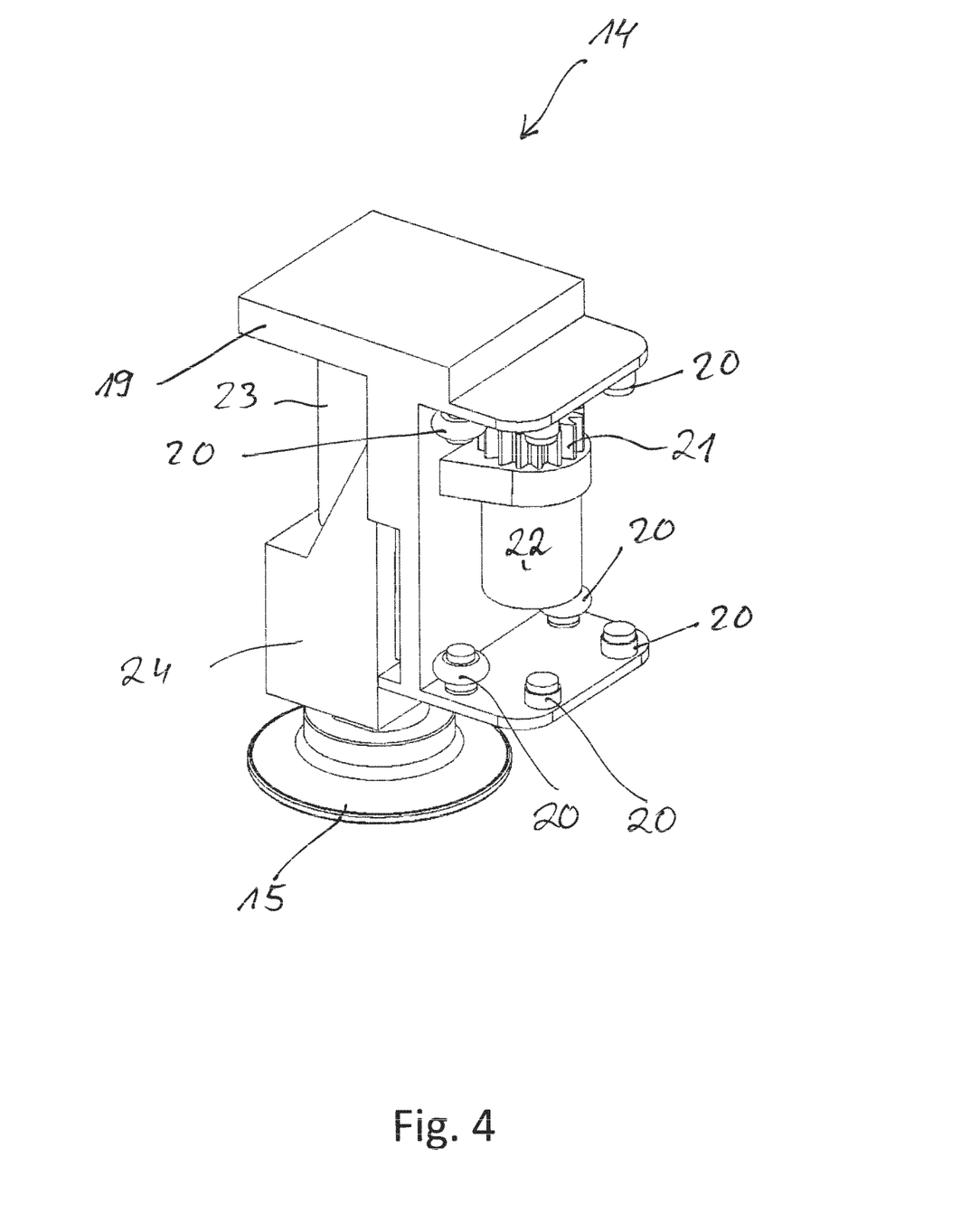
FIG. 4 shows an adhesive module 14 from the inside in a perspective view.

In FIG. 4, a single adhesive module 14 is shown in perspective view from the inside. A holder 19 bears the upper and lower pairs of guide rollers 20; the interior guide rollers have a rubber-elastic add-on. The guide rollers 20 engage with the profile rails 16, 17. Furthermore, the holder 19 supports a gear 21 for engaging with the gear rack 18 that is driven by an electric motor 22.

Figure 5:
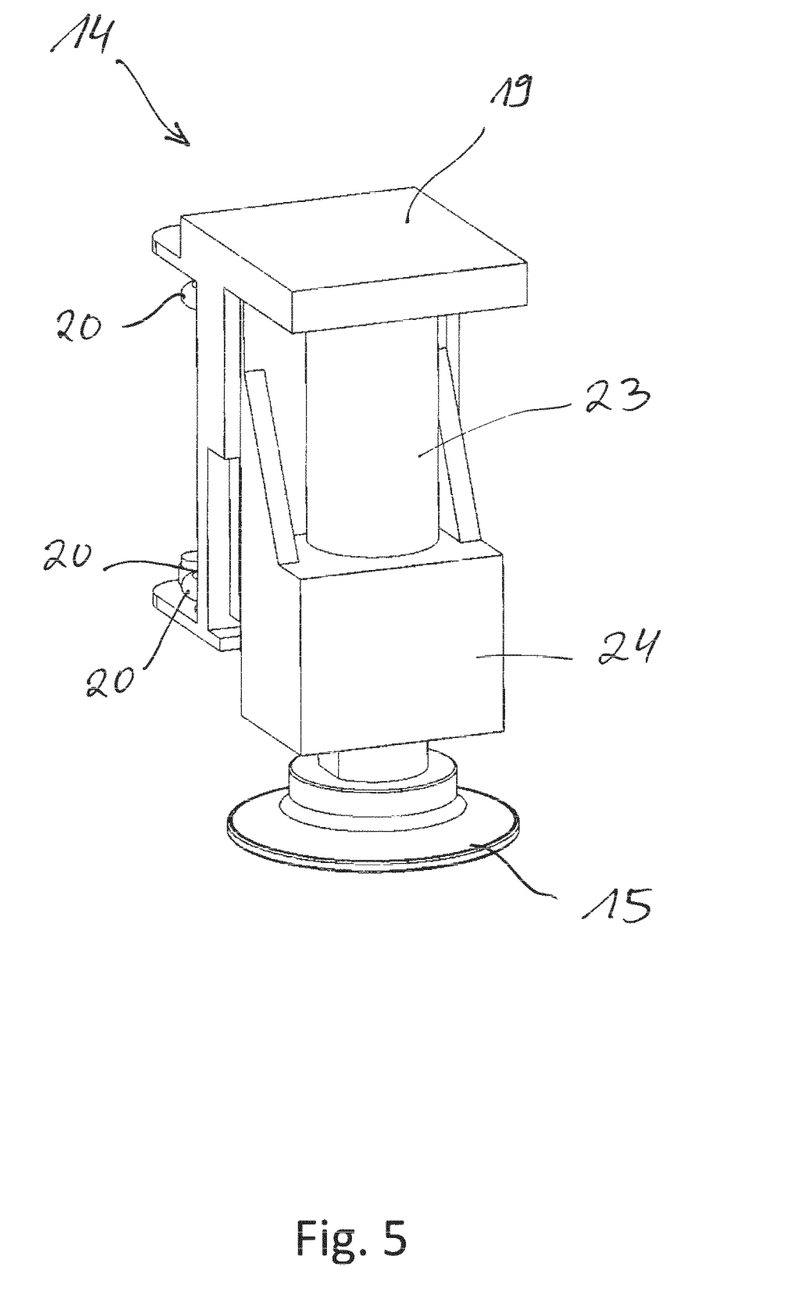
FIG. 5 shows an adhesive module 14 from the outside in a perspective view.

FIG. 5 shows the adhesive module 14 in a perspective view from the outside. A spindle 23 supported by the holder 19 serves to lower and raise the adhesive foot 15 from the traveling surface in a continuously variable way. Moreover, an electronic unit 24 that permits individual control of each adhesive module 14 and, in fact, both with regard to the movement of the adhesive modules 14 along the track guides and with regard to the lifting and lowering of the adhesive feet 15 is housed in each adhesive module 14. A resource-supply tube is routed from the distributor connection 13 of the 2nd assembly 11 of the chassis 1 to each adhesive module 14 for the electronic unit 24, the electric motor 22 and the adhesive feet 14, designed to be suction feet here.

Figure 6:
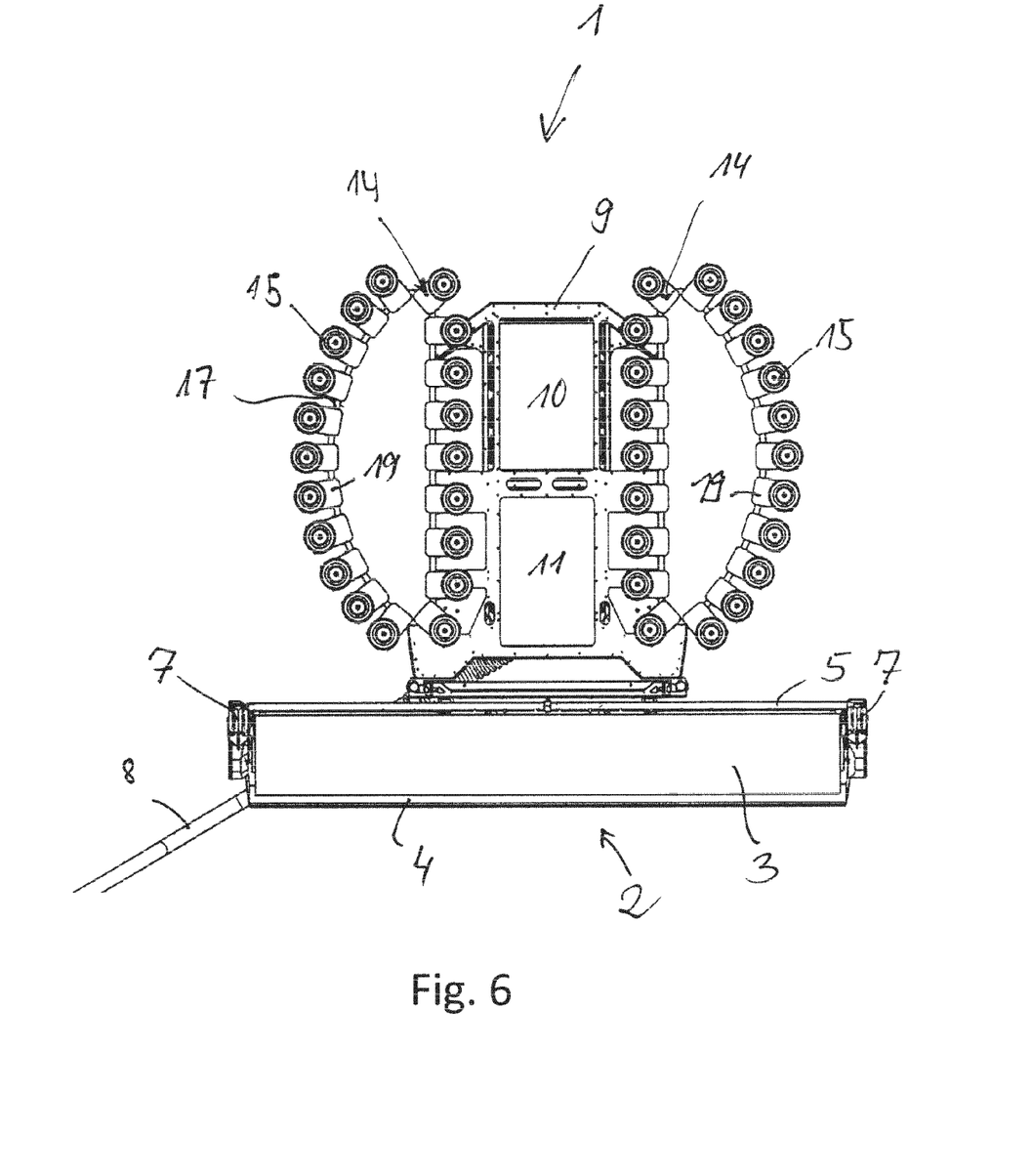
FIG. 6 shows the cleaning robot in a view from the bottom with evenly distributed adhesive modules.

FIG. 6 shows the cleaning robot in a view from the bottom. The two track guides with the profile rails, of which only the lower profile rail 17 can be seen, are especially visible in this view. Whereas the two inner track-guide sections run in parallel with one another for the purpose of straight travel, the two outer track-guide sections form arcs of a full circle around with the robot can rotate. The reciprocal spacing of the parallel rail-guide sections vis-a-vis one another is selected in such a way that the number of adhesive modules 14 is essentially well distributed in an even way on the straight track-guide sections and the arc-like track-guide sections, in order to ensure reliable straightaway travel and reliable rotation. In addition, the reciprocal spacing of the parallel rack-guide sections takes into account that the robot cannot tip over and that the assemblies 10, 11 still have to be fit between them in the interest of a flat design.

A circle that is drawn around the arc sections should have a diameter that is large enough for the chassis 1 to seat a sufficient number of adhesive modules 14 for reliable travel. On the other hand, a circle drawn around the arc sections should not have a diameter that exceeds the width of the cleaning device 2. In the example, twenty adhesive modules 14 run on each track guide, and thus a total of forty adhesive modules 14 per chassis 1, the holders 18 and adhesive feet 15 of which can be seen. The adhesive modules 14 have the same spacing vis-a-vis one another in this figure. But that is not always advantageous for travel on a traveling surface.

FIGS. 7-10, in contrast, illustrate operating modes in which the adhesive modules 14 have at least in part different spacing distances vis-a-vis one another by means of intelligent, computer-aided control; the lifting distances of the adhesive feet 15 can also be different vis-a-vis one another.

Figure 7:
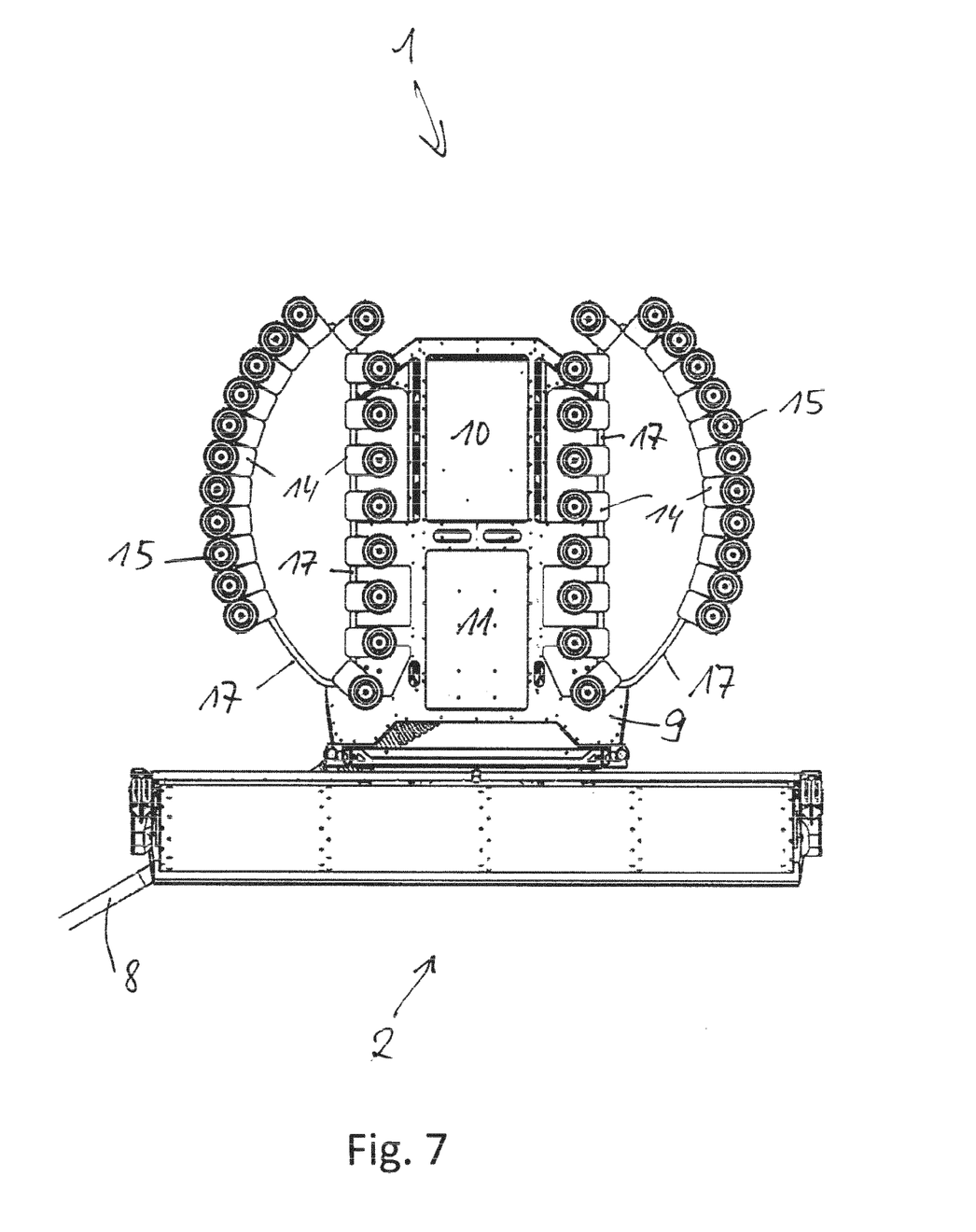
FIG. 7 to FIG. 10 show various traveling modes.

So it is advantageous for forward travel with the chassis 1 when, in accordance with FIG. 7, the adhesive modules 14 are automatically controlled in such a way that the adhesive modules 14 that have been vented and lifted from the traveling surface and that are on the arc-shaped track sections in each case are buffered towards the front direction-changing points in the direction of travel by keeping their spacing distances vis-a-vis one another as small as possible. This is possible because the adhesive modules 14, in contrast to the above-mentioned prior art, are not moved in a synchronous fashion by run-around traction means; instead, each adhesive module 14 has its own motor drive with an electric motor 22 in accordance with the invention. As a result, the front direction-changing points in the direction of travel can be negotiated more quickly, which benefits the travel speed. For the returning adhesive modules 14, the time that they need around the rear direction-changing points in the direction of travel is secondary because their adhesive feet 15 are automatically vented and raised and they consequently do not make a contribution to travel.

Figure 8:
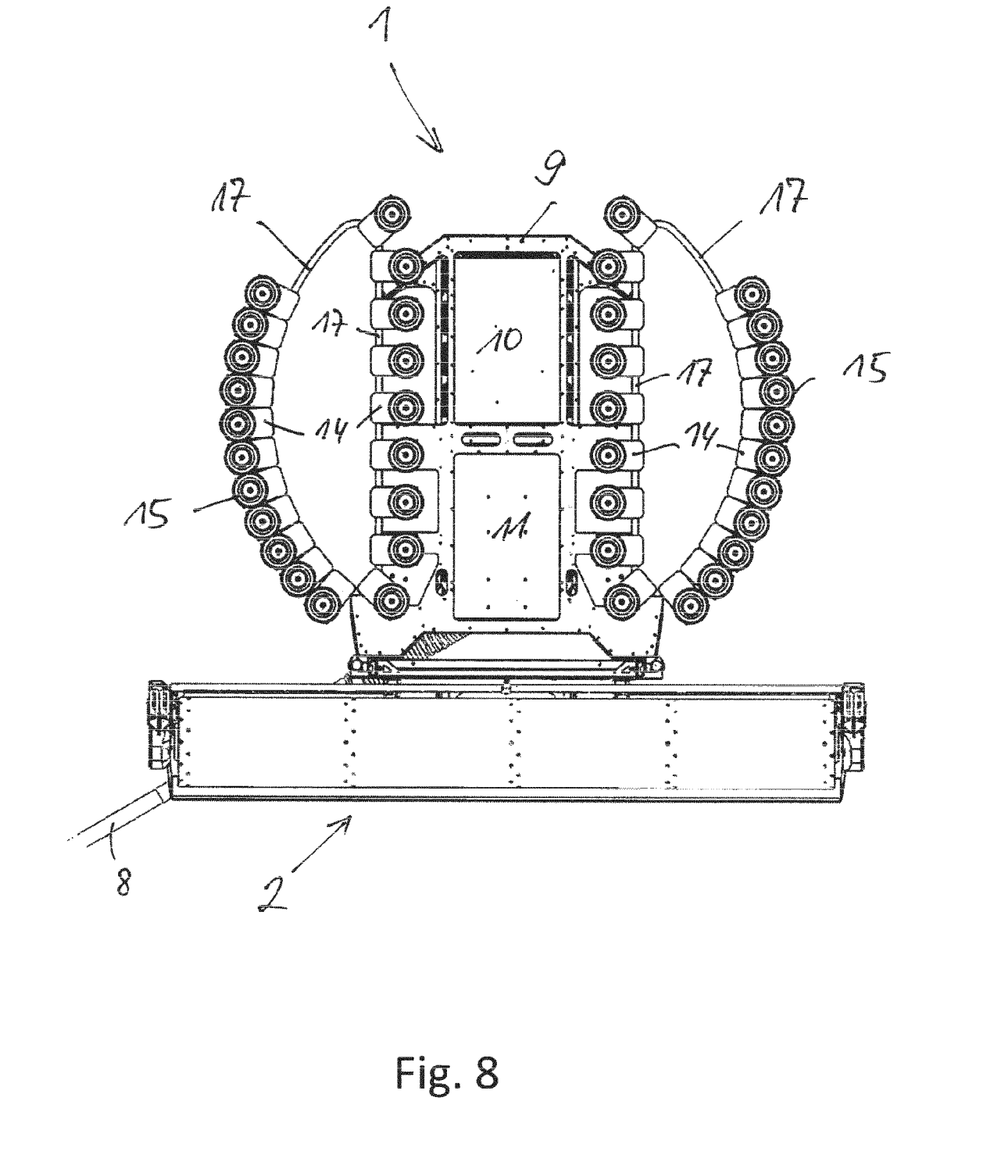

FIG. 8 shows the situation travel with the cleaning device 2 in front. The lifted adhesive modules 14 are likewise advantageously buffered towards the front direction-changing points in the direction of travel here.

Figure 9:
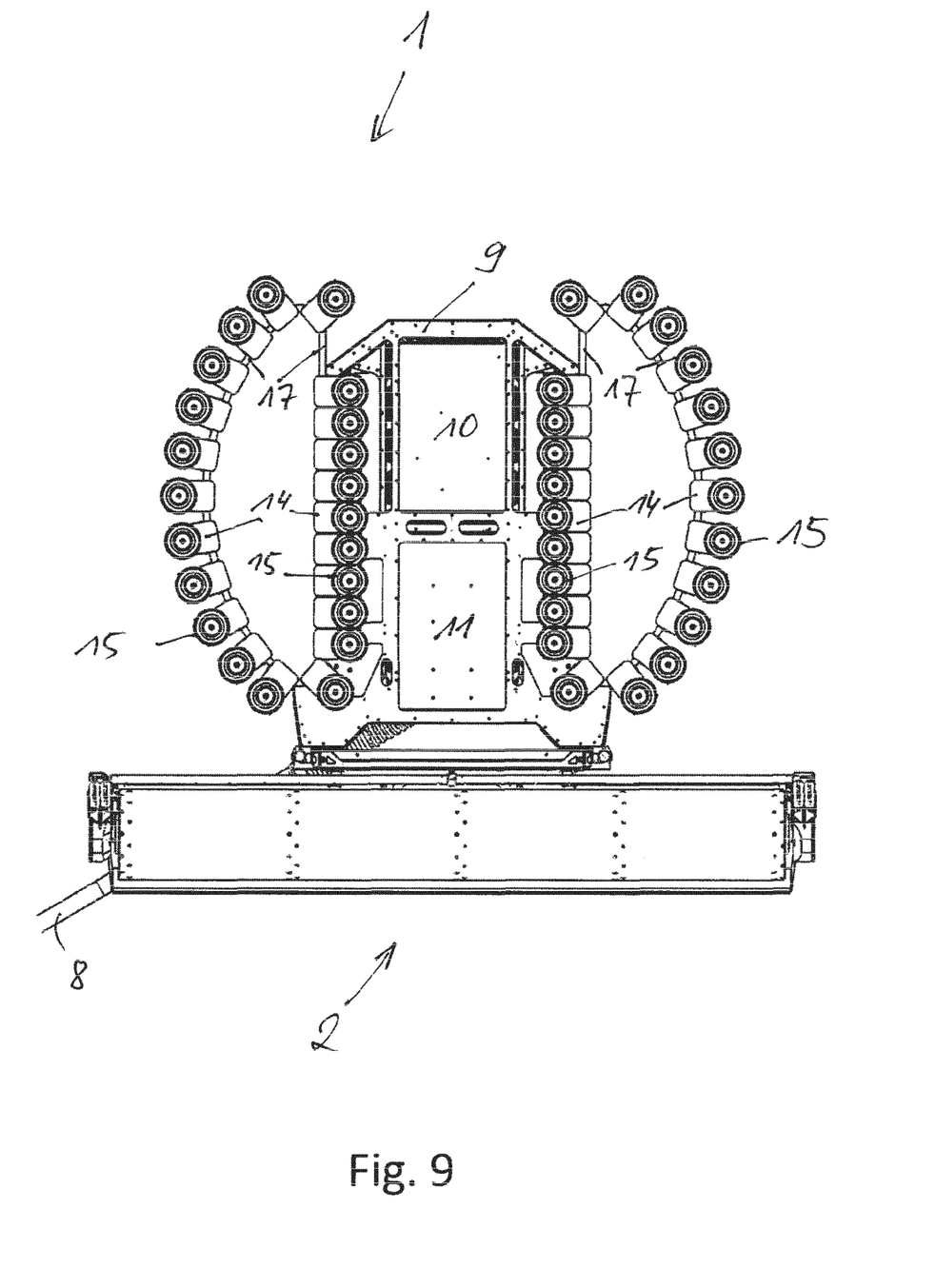

For rotation in accordance with FIG. 9 in a clockwise direction, looking onto the drawing sheet, it is advantageous when the vented and lifted adhesive modules 14 are buffered on the straight-guide sections towards the cleaning device 2, and for rotation in a counter clockwise direction in accordance with FIG. 10, once again looking onto the drawing sheet, it is advantageous when the vented and lifted adhesive modules 14 are buffered on the straight-guide sections in the direction opposite the cleaning device 2.

Figure 10:
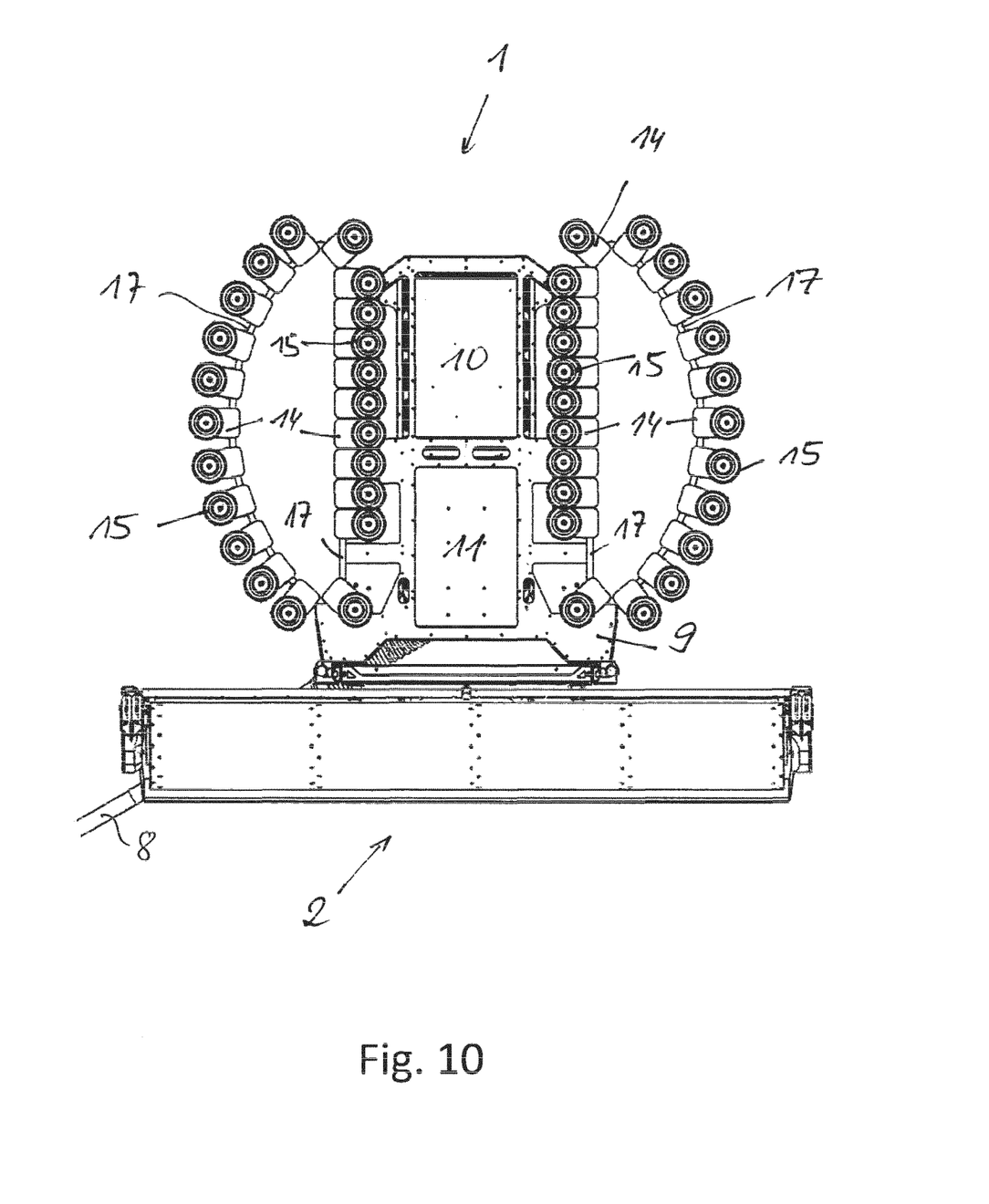
Figure 11:
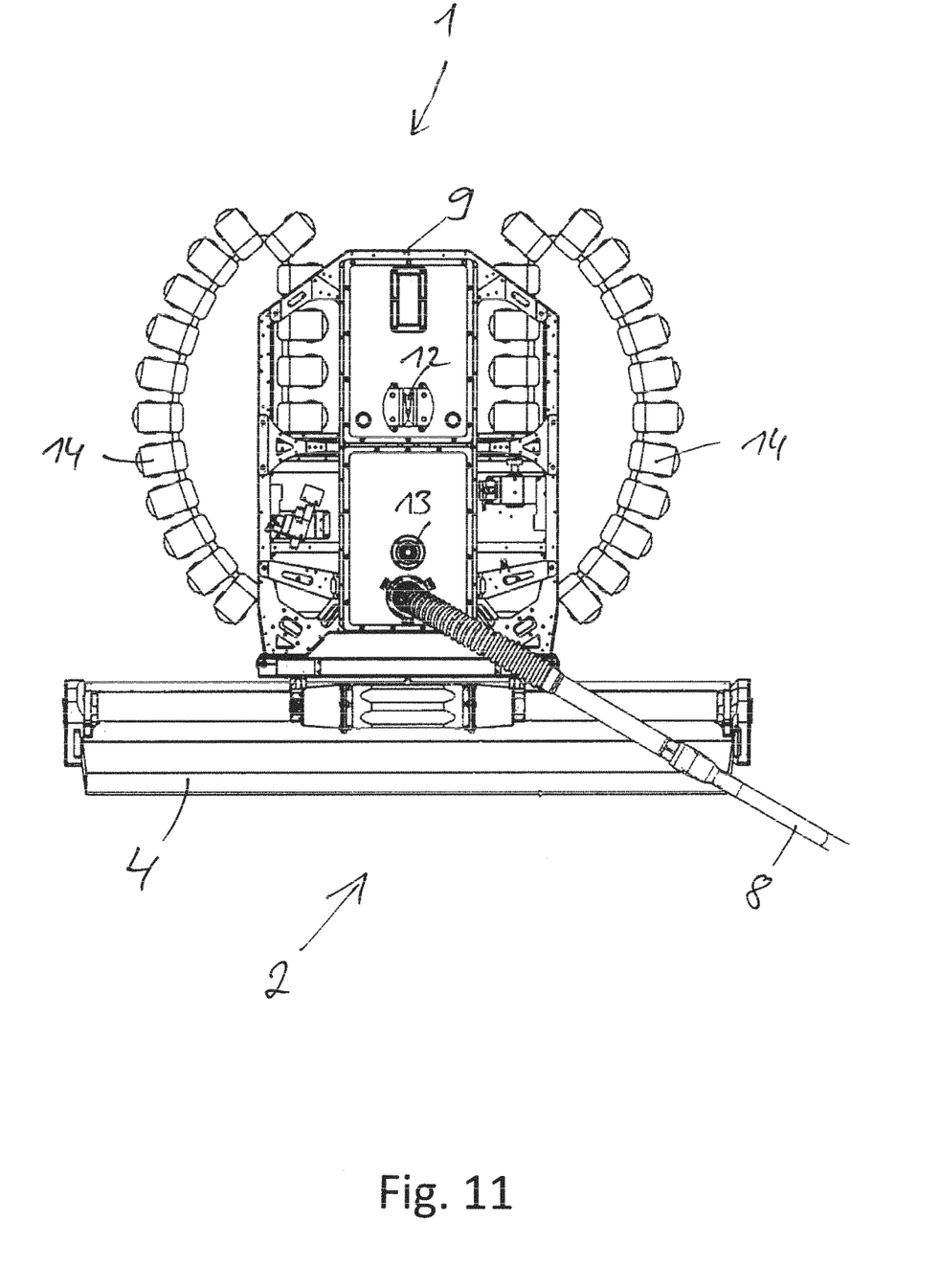
FIG. 11 shows the cleaning robot in a top view.

The adhesive modules 14 that are to next be lowered for travel/rotation and to be actuated with a vacuum will always be ready more quickly than in the case of a tension rod movement, which is why the robot can travel and be steered more quickly on the whole. The adhesive modules 14 are buffered in the process with fully automatic control by means of a microprocessor that recognizes the commands "forward travel", "backwards travel", "right-hand rotation", "left-hand rotation" and correspondingly controls the electric motors 22 of the adhesive modules 14.

When there is travel at a tilt over oblong obstacles such as mounting strips and cover strips or the like, it is useful to not fully automatically buffer the adhesive modules 14 at the direction-changing points, but to instead do so with the two sides at an offset in accordance with the angle of tilt vis-a-vis the obstacle between the adhesive modules 14 that run on the parallel straightaway sections; a gap of e.g. 40 mm arises between the adapted adhesive modules 14 in each case. Obstacles of that type can be overcome without problems in this way, and without the robot rising up. Sensors installed in the robot, for instance distance probes or IR sensors, recognize the obstacle itself. In addition, the robot recognizes with the aid of the sensors whether the traveling surface is even, convex or concave or otherwise uneven. The adhesive feet 15 of the adhesive modules 14 can be adjusted by motor in a continuously variable way, for instance by 25 mm, in order to achieve good traveling results, even on traveling surfaces that are not even. The microprocessor of the robot evaluates the sensor signals and individually adjusts the lifting distances of each adhesive foot 15 in adaptation to the traveling surface.

So a situation cannot happen in which the adhesive feet 15 that are contributing to the movement of the robot at the moment, and thus the adhesive feet 15 that are running on straight guides during straightaway motions, for instance, hang in the air or skid the robot. The robot therefore always provides enough holding power to the traveling surface. In the example, the holding force is naturally also dependent upon the suction force, the characteristics of the traveling surface and the design of the suction feet. The automatic control of the continuously variable lifting height of the adhesive feet 15 can also be used to overcome strips and similar obstacles during straightaway and tilted travel.

There are provisions to only realize the design in the example with one electric motor 22 for each adhesive module 14, both for the movement of the adhesive modules 14 along the guide rails 16, 17 and the lifting strokes of the adhesive feet 15, in order to save weight and construction material. The combined drive of the movement and lifting is achieved with the electric motor 22, a hollow shaft that is not visible and the spindle 23 together with an automatic changeover from the travel drive to the lifting drive. The electronic unit 24 in each adhesive module 14 controls the process in a detailed way in cooperation with the microprocessor.

It is alternatively possible, of course, to use separate actuators for the movement of the adhesive modules 14 and the lifting and lowering of the adhesive feet 15. They can operate on an electromagnetic, pneumatic or hydraulic basis. The chassis 1 can be used for many different kinds of work and construction circumstances. A preferred application area, however, is a modification as a cleaning robot for tilted and vertical glass and metal walls, as well as tilted, curved or impassable roofs; pneumatically actuated suction units or electrically actuated electromagnets can serve as adhesive feet 15.

Figure 12:
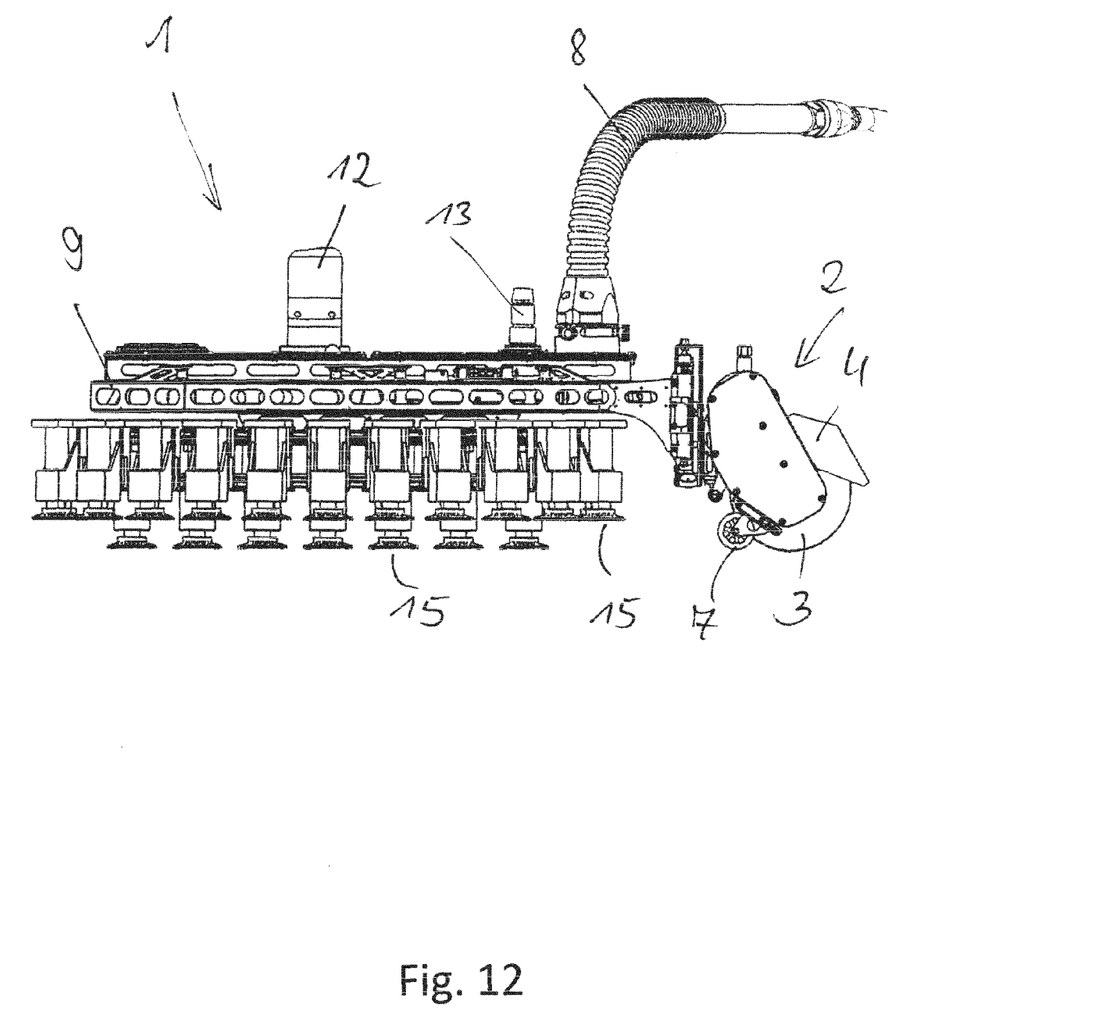
FIG. 12 shows the cleaning robot in a side view.
Figure 13:
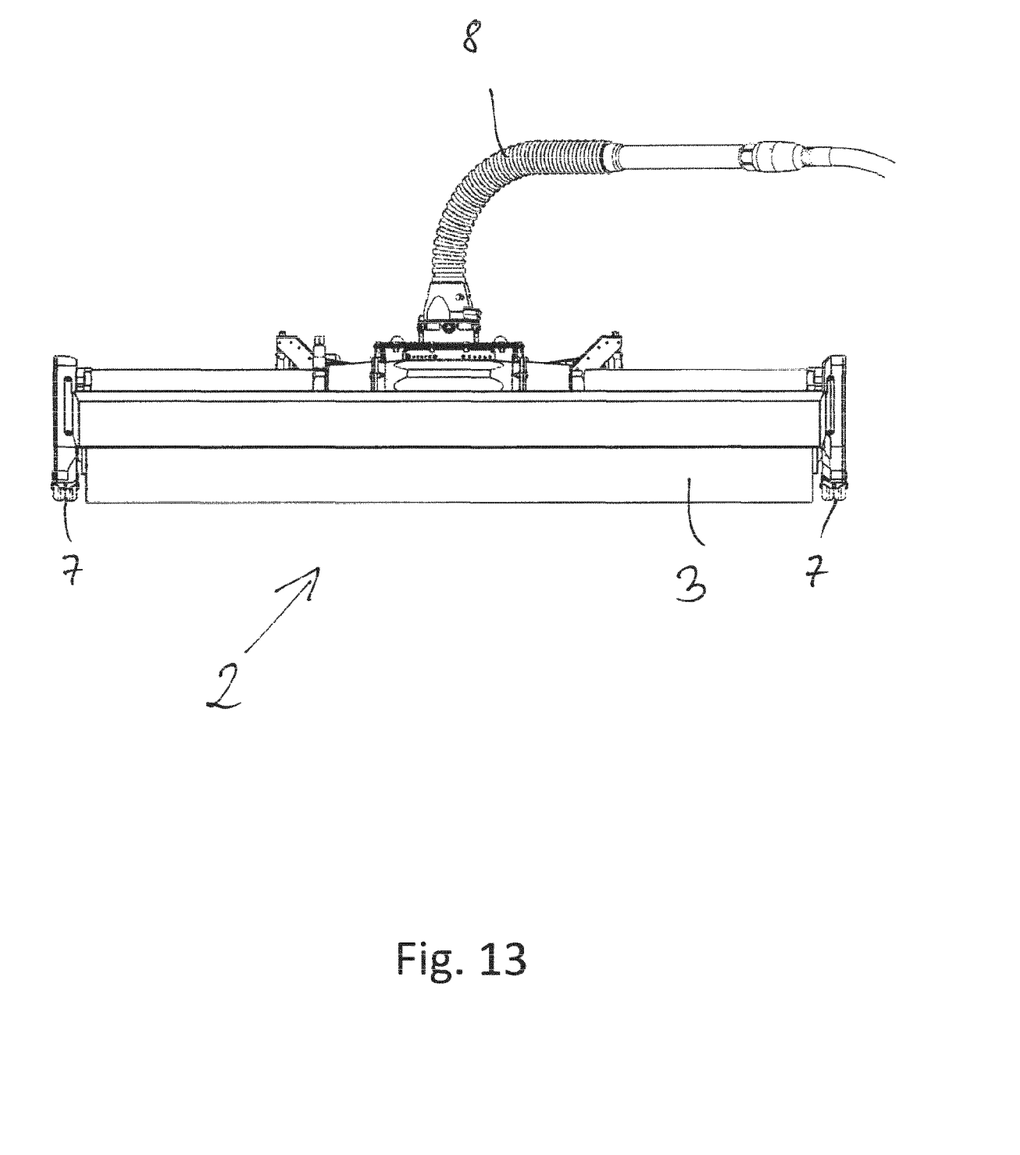
FIG. 13 shows the cleaning robot with a view of the cleaning device from the front and FIG. 14 shows the cleaning robot with a view of the chassis from the front.
Figure 14:
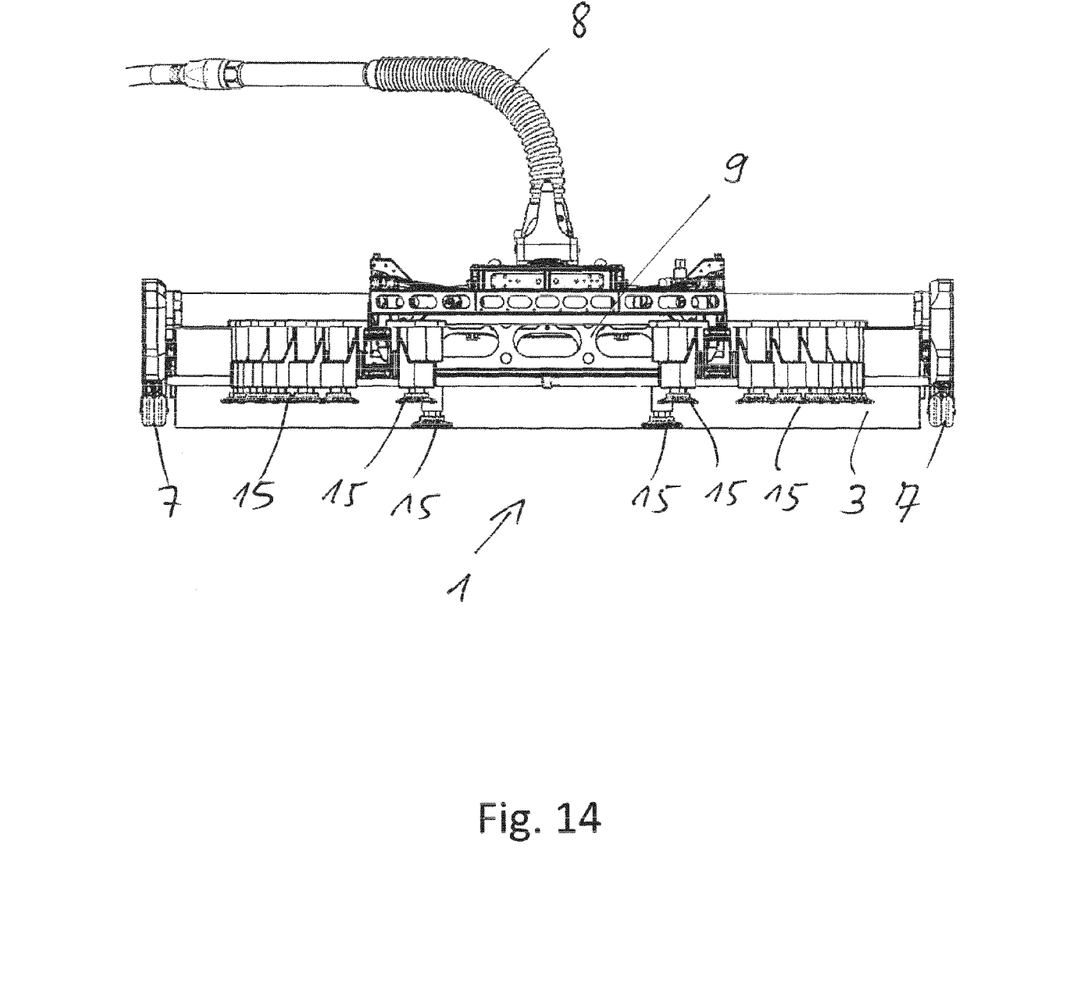

A cleaning robot of this type is shown in FIGS. 11 to 14 once again in a top view, in a side view, in a front view of the cleaning device 2 and in a front view of the chassis 1. All of the components essential for the invention have already been described for the previous figures. The series arrangements of lowered and raised adhesive feet 15 are especially evident in FIGS. 12 to 14.

List of Reference Numerals
1 Chassis of a robot
2 Cleaning device
3 Cleaning brush
4 Splash guard
5 Adjustment shaft
6 Holder
7 Support wheel
8 Multifunctional tube
9 Support frame
10 1st assembly
11 2nd assembly
12 Antenna
13 Distributor connection
14 Adhesive module
15 Adhesive foot
16 Upper guide rail of a track guide
17 Lower guide rail of a track guide
18 Rack rail
19 Holder
20 Guide rollers
21 Gear
22 Electric motor
23 Spindle
24 Electronic unit

The invention claimed is:

1. Chassis for a robot for traveling over smooth, curved or firm surfaces with two track guides that are mirror-symmetric to one another and firmly arranged in the chassis in parallel with the traveling surface and self-contained in each case, along which controllable adhesive modules circulate one behind the other in such a way that adhesive feet of the adhesive modules, which are lifted and lowered to the traveling surface, always point towards the traveling surface,
characterized in that
the individual adhesive modules each have their own controllable lifting and traveling drives, wherein each adhesive module has a combined lifting and traveling drive that can be driven by the module's own electric motor.

2. Chassis in accordance with claim 1,
characterized by
an automatically controllable changeover from lifting mode to traveling mode for each individual adhesive module.

3. Chassis according to claim 1,
characterized by
a continuously variable lifting and traveling mode for each individual adhesive module.

4. Chassis according to claim 1,
characterized in that
the track guides of a chassis are comprised of two straight guides in parallel with one another with connected circular-arc guides that lie in a conceptual full circle which includes the straight guides.

5. Chassis according to claim 1,
characterized in that
only the adhesive feet of the adhesive modules that are lowered on the straight guides and that run concordantly make straightaway travel (forward travel, reverse travel) of the chassis possible, whereas only the adhesive feet of the adhesive modules that are lowered on circular-arc guides and that run concordantly make a rotation (clockwise, counter-clockwise) of the chassis possible.

6. Chassis according to claim 1,
characterized in that
the track guides are comprised of guide rails in which accompanying rack rails are installed in which gears of the adhesive modules driven by traveling drives mesh.

7. Chassis according to claim 1,
characterized in that
the adhesive modules adhere to a traveling surface via suction force or electromagnetic force.

8. Chassis according to claim 1,
characterized in that
the chassis carries a remote-controlled traveling-surface cleaning device.

9. Chassis according to claim 1,
characterized in that
the chassis carries, solely or additionally, a remote-controlled inspection device or a remote-controlled manipulator.

\* \* \* \* \*